(12) United States Patent
Liu et al.

(10) Patent No.: US 11,363,472 B2
(45) Date of Patent: Jun. 14, 2022

(54) CONTROL METHOD FOR ACTIVATION AND DEACTIVATION OF DATA DUPLICATION TRANSMISSION

(71) Applicant: Huawei Technologies Co., Ltd., Shenzhen (CN)

(72) Inventors: Jing Liu, Shanghai (CN); Tingting Wang, Shenzhen (CN); Mingzeng Dai, Shanghai (CN); Hongping Zhang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/503,180

(22) Filed: Jul. 3, 2019

(65) Prior Publication Data

US 2019/0327623 A1   Oct. 24, 2019

Related U.S. Application Data

(63) Continuation of application No. PCT/CN2018/071244, filed on Jan. 4, 2018.

(30) Foreign Application Priority Data

Jan. 5, 2017 (CN) .......................... 201710007875.8

(51) Int. Cl.
*H04W 24/02* (2009.01)
*H04L 45/24* (2022.01)
(Continued)

(52) U.S. Cl.
CPC ........... *H04W 24/02* (2013.01); *H04L 45/245* (2013.01); *H04W 8/24* (2013.01); *H04W 84/045* (2013.01)

(58) Field of Classification Search
CPC ......... H04W 24/02; H04W 8/24; H04W 8/22; H04W 84/045; H04W 76/15; H04W 24/08; H04W 76/11; H04L 45/245; H04L 1/08

See application file for complete search history.

(56) References Cited

U.S. PATENT DOCUMENTS

2010/0067478 A1   3/2010   Dillinger et al.
2012/0057560 A1   3/2012   Park et al.
(Continued)

FOREIGN PATENT DOCUMENTS

CN   103875275 A   6/2014
CN   103888987 A   6/2014
(Continued)

OTHER PUBLICATIONS

"UP aspects of Upper layer aggregation (DC like) for multi-connectivity," 3GPP TSG-RAN WG2 #96, Reno, Nevada, USA, R2-168670, XP051178226, pp. 1-4, 3rd Generation Partnership Project, Valbonne, France (Nov. 14-18, 2016).
(Continued)

*Primary Examiner* — Ian N Moore
*Assistant Examiner* — Sun Jong Kim
(74) *Attorney, Agent, or Firm* — Leydig, Voit & Mayer, Ltd.

(57) ABSTRACT

A data transmission method includes: receiving, by a user equipment (UE), first indication information from a wireless access device, where the first indication information is activation indication information or deactivation indication information; and when the first indication information is the activation indication information, executing, by the UE, a processing operation; or when the first indication information is the deactivation indication information, stopping, by the UE, the processing operation; where the processing
(Continued)

operation includes at least one of a duplication operation and a switching operation; the duplication operation means transmitting same data through a plurality of links; and the switching operation means selecting one from a plurality of links to perform data transmission.

8 Claims, 6 Drawing Sheets

(51) Int. Cl.
*H04W 8/24* (2009.01)
*H04W 84/04* (2009.01)

(56) References Cited

U.S. PATENT DOCUMENTS

| | | | | |
|---|---|---|---|---|
| 2012/0113886 | A1* | 5/2012 | Zhang | H04W 72/005 370/312 |
| 2016/0057585 | A1 | 2/2016 | Horn et al. | |
| 2016/0242193 | A1* | 8/2016 | Hong | H04W 76/10 |
| 2016/0255619 | A1* | 9/2016 | Yi | H04W 24/08 370/252 |
| 2018/0092071 | A1 | 3/2018 | Dinan et al. | |
| 2018/0160397 | A1* | 6/2018 | Zhao | H04W 72/005 |
| 2019/0098606 | A1* | 3/2019 | Sharma | H04B 7/0404 |
| 2019/0327607 | A1* | 10/2019 | Xiao | H04W 28/16 |

FOREIGN PATENT DOCUMENTS

| | | |
|---|---|---|
| CN | 104969578 A | 10/2015 |
| CN | 105451364 A | 3/2016 |
| CN | 107979847 A | 5/2018 |
| EP | 3522667 A1 | 8/2019 |
| JP | 2016517239 A | 6/2016 |
| JP | 2018504052 A | 2/2018 |
| WO | 2015060544 A1 | 4/2015 |

OTHER PUBLICATIONS

"Configuration and activation/deactivation of duplication," 3GPP TSG-RAN WG2 Meeting #98, Hangzhou, China, R2-1704247, XP051274825, pp. 1-2, 3rd Generation Partnership Project, Valbonne, France (May 15-19, 2017).

"Packet Duplication for URLLC," 3GPP TSG-RAN WG2 Meeting #96, Reno, USA, R2-168845, pp. 1-6, 3rd Generation Partnership Project, Valbonne, France(Nov. 14-18, 2016).

"3rd Generation Partnership Project; Technical Specification Group Radio Access Network; Evolved Universal Terrestrial Radio Access (E-UTRA); Medium Access Control (MAC) protocol specification(Release 14)," 3GPP TS 36.321 V14.1.0, pp. 1-98, 3rd Generation Partnership Project, Valbonne, France (Dec. 2016).

"3rd Generation Partnership Project; Technical Specification Group Radio Access Network; Evolved Universal Terrestrial Radio Access (E-UTRA); Radio Resource Control (RRC); Protocol specification(Release 14)," 3GPP TS 36.331 V14.0.0, pp. 1-643, 3rd Generation Partnership Project, Valbonne, France (Sep. 2016).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.1.0, pp. 1-317, 3rd Generation Partnership Project, Valbonne, France (Dec. 2016).

* cited by examiner

CONTROL METHOD FOR ACTIVATION AND DEACTIVATION OF DATA DUPLICATION TRANSMISSION

CROSS-REFERENCE TO RELATED APPLICATIONS

This application is a continuation of International Application No. PCT/CN2018/071244, filed on Jan. 4, 2018, which claims priority to Chinese Patent Application No. 201710007875.8, filed on Jan. 5, 2017. The disclosures of the aforementioned applications are hereby incorporated by reference in their entireties.

TECHNICAL FIELD

The present application relates to the field of communications technologies, and in particular, to a data transmission method and apparatus.

BACKGROUND

The 3rd Generation Partnership Project (3GPP) Release 12 (R12) introduces a dual connectivity (DC) scenario, in which a user equipment (UE) connects to both a macro base station (MeNB) and a small base station (SeNB), and simultaneously performs data transmission with both base stations.

In the DC scenario, the UE establishes a signaling radio bearer (SRB) with the MeNB on a control plane, and establishes a data radio bearer (DRB) with each of the MeNB and the SeNB on a user plane. DRBs include a DRB secondary cell group bearer and a DRB split bearer. The secondary cell group bearer means that data on an evolved packet system (EPS) bearer corresponding to a user is all transmitted through the SeNB. The split bearer means that the MeNB transmits some data on an EPS bearer corresponding to a user through the MeNB and transmits some data on the EPS bearer through the SeNB.

When the DC scenario is applied to a 5th Generation (5G) system, because an ultra-reliable and low latency communications (URLLC) service is introduced into the 5G system and the URLLC service requires a data transmission latency less than 0.5 ms and a data transmission success rate greater than or equal to 99.99%, an existing data transmission solution cannot meet the requirements of the URLLC service.

SUMMARY

This application provides a data transmission method and apparatus, to resolve a problem that an existing data transmission solution cannot meet a URLLC service requirement.

According to a first aspect, a data transmission method is provided. The method includes: receiving, by a UE, first indication information sent by a wireless access device, where the first indication information is activation indication information or deactivation indication information, the activation indication information is used to instruct the UE to execute a processing operation, the deactivation indication information is used to instruct the UE to stop the processing operation, and the processing operation includes at least one of a duplication operation and a switching operation; and when the first indication information is the activation indication information, executing, by the UE, the processing operation; or when the first indication information is the deactivation indication information, stopping, by the UE, the processing operation; where the duplication operation means transmitting same data through a plurality of links; and the switching operation means selecting one from a plurality of links to perform data transmission.

When the UE executes the duplication operation, the UE transmits same data through a plurality of links. In this way, a link with relatively good link signal quality in the plurality of links may be used to improve reliability of the data transmission. When the UE executes the switching operation, the UE selects one from a plurality of links to perform data transmission. The selected link usually has relatively good quality. Therefore, reliability of the data transmission can also be improved. This resolves a problem that existing single-link data transmission cannot ensure high reliability for URLLC, and meets a URLLC service requirement.

When no processing operation needs to be executed, the wireless access device sends the deactivation indication information to the UE, to instruct the UE to stop the processing operation, thereby reducing additional resource overheads caused by data transmission performed through the processing operation.

In a first possible implementation of the first aspect, the method further includes: receiving, by the UE, an execution condition sent by the wireless access device, where the execution condition is used by the UE to determine whether to execute the processing operation; and in this case, the executing, by the UE, the processing operation includes: when the UE meets the execution condition, executing, by the UE, the processing operation.

In a second possible implementation of the first aspect, the UE receives a first threshold sent by the wireless access device; and in this case, the UE executes processing operation, including: the UE determines a data volume of to-be-sent uplink data; and the UE executes the duplication operation when the data volume is less than the first threshold, or the UE executes the switching operation when the data volume is greater than the first threshold; or the UE executes the duplication operation when the data volume is greater than the first threshold, or the UE executes the switching operation when the data volume is less than the first threshold.

When the data volume of the uplink data is relatively large, sending a same piece of data on a plurality of links wastes resources. Therefore, a same piece of data is sent on a plurality of links only when the data volume is less than the first threshold. This saves resources and also ensures reliability of the data transmission. When the data volume of the uplink data is relatively large, one link is selected to perform uplink data transmission, to ensure transmission reliability of the uplink data.

In a third possible implementation of the first aspect, the method further includes: the UE receives second indication information sent by the wireless access device, where the second indication information is used to indicate an SRB established based on links and/or a DRB established based on links, and the second indication information is associated with the first indication information; and in this case, the UE executes the processing operation including: when the second indication information indicates the SRB, the UE selects the links corresponding to the SRB to execute the processing operation; or when the second indication information indicates the DRB, the UE selects the links corresponding to the DRB to execute the processing operation.

With reference to the third possible implementation of the first aspect, in a fourth possible implementation of the first aspect, the method further includes: the UE receives a DRB identifier sent by the wireless access device; and in this case, the UE selects the links corresponding to the DRB to execute the processing operation including: the UE selects links corresponding to a DRB indicated by the DRB identifier to execute the processing operation, where the DRB identifier is associated with the first indication information.

Optionally, the UE further receives an SRB identifier sent by a master wireless access device, and selects links corresponding to an SRB indicated by the SRB identifier to execute the processing operation, where the SRB identifier is associated with the first indication information.

In a fifth possible implementation of the first aspect, before the receiving, by UE, first indication information sent by a wireless access device, the method further includes: the UE sends capability information of the UE to a master wireless access device, where the capability information is used to indicate whether the UE supports the processing operation.

The UE sends the capability information to the wireless access device to indicate whether the UE supports the processing operation. After determining that the UE supports the processing operation, the wireless access device sends the first indication information to the UE, thereby avoiding a resource waste caused by sending the first indication information to the UE when the UE does not support the processing operation.

With reference to any one of the first aspect to the fifth possible implementation of the first aspect, in a sixth possible implementation of the first aspect, when the wireless access device is applied to a carrier aggregation (CA) scenario, the method further includes: the UE receives cell identification information sent by a master wireless access device, and determines a serving cell indicated by the cell identification information as a serving cell for performing the duplication operation; or the UE receives a cell quantity and a second threshold that are sent by the wireless access device, and the UE selects a serving cell whose link signal quality is greater than the second threshold as a serving cell for performing the duplication operation, where a total quantity of all selected serving cells does not exceed the cell quantity; or the UE determines a serving cell that sends downlink data to the UE as a serving cell for performing the duplication operation.

Selecting the serving cell whose link signal quality is greater than the second threshold as the serving cell for performing the duplication operation can further improve reliability of the data transmission.

With reference to any one of the first aspect to the fifth possible implementation of the first aspect, in a seventh possible implementation of the first aspect, when the wireless access device is applied to a DC scenario or a multiple connectivity (MC) scenario, and the wireless access device is a master wireless access device, the method further includes: the UE receives secondary wireless access device identification information sent by the master wireless access device, and determines a secondary wireless access device indicated by the secondary wireless access device identification information as a wireless access device for performing the duplication operation; or the UE receives a wireless access device quantity and a third threshold that are sent by the master wireless access device, and selects a wireless access device whose link signal quality is greater than the third threshold as a wireless access device for performing the duplication operation, where a total quantity of all selected wireless access devices does not exceed the wireless access device quantity; or the UE determines a wireless access device that sends downlink data to the UE as a wireless access device for performing the duplication operation.

Selecting the wireless access device whose link signal quality is greater than the third threshold as the wireless access device for performing the duplication operation can further improve reliability of the data transmission.

With reference to the seventh possible implementation of the first aspect, in an eighth possible implementation of the first aspect, when the duplication operation is executed, the method further includes: the UE sends a first buffer status report (BSR) separately to the master wireless access device and each secondary wireless access device, where the first BSR includes a product obtained by multiplying a data volume at a Packet Data Convergence Protocol (PDCP) layer of the master wireless access device by a quantity of wireless access devices executing the duplication operation and a sum of data volumes at respective Radio Link Control (RLC) layers corresponding to the master wireless access device and each secondary wireless access device.

With reference to the seventh possible implementation of the first aspect, in a ninth possible implementation of the first aspect, when the duplication operation is executed, the method further includes: the UE receives an uplink (UL) grant sent by the wireless access device, where the wireless access device is the master wireless access device or one of secondary wireless access devices; and the UE sends a second BSR to the wireless access device on an uplink resource indicated by the UL grant, where the second BSR includes a product obtained by multiplying a data volume at a PDCP layer of the master wireless access device by a quantity of wireless access devices executing the duplication operation and a sum of data volumes at respective RLC layers of the master wireless access device and each secondary wireless access device; or the second BSR includes a smaller value between a sum of a data volume at a PDCP layer of the master wireless access device and a data volume at an RLC layer of each secondary wireless access device and a sum of the data volume at the PDCP layer and a data volume at an RLC layer of the master wireless access device.

With reference to the seventh possible implementation of the first aspect, in a tenth possible implementation of the first aspect, when the duplication operation is executed, the method further includes: the UE sends a third BSR to the master wireless access device, and sends a fourth BSR to each secondary wireless access device, where the third BSR includes a sum of data volumes at a PDCP layer and an RLC layer of the master wireless access device, and the fourth BSR includes a sum of the data volume at the PDCP layer of the master wireless access device and a data volume at an RLC layer of the secondary wireless access device.

With reference to the seventh possible implementation of the first aspect, in an eleventh possible implementation of the first aspect, when the duplication operation is executed, the method further includes: the UE receives a PDCP protocol data unit (PDU) sent by each wireless access device on its respective link; and the UE sends a PDCP status report to the master wireless access device, where when the wireless access device includes the master wireless access device, the PDCP status report is used to instruct the master wireless access device to: notify an RLC layer of the master wireless access device and an RLC layer of each secondary wireless access device executing the duplication operation of a sequence number (SN) corresponding to a correctly received PDCP PDU; and instruct the RLC layer of the master wireless access device and the RLC layer of each secondary wireless access device executing the duplication operation to stop an RLC PDU automatic repeat request (ARQ) corresponding to the correctly received PDCP PDU at the RLC layer; or when the wireless access device does not include the master wireless access device, the PDCP status report is used to instruct the master wireless access device to: notify an RLC layer of each secondary wireless access device executing the duplication operation of an SN corresponding to a correctly received PDCP PDU; and instruct the RLC layer of each secondary wireless access device executing the duplication operation to stop an RLC PDU ARQ corresponding to the correctly received PDCP PDU at the RLC layer.

When the duplication operation is executed, the UE receives same PDCP PDUs on a plurality of links and the UE reports the PDCP status report to the master wireless access device. To reduce air interface overheads and reduce a data transmission delay, the PDCP layer of the master wireless access device needs to instruct the RLC layer of each secondary wireless access device executing the duplication operation to stop the RLC PDU ARQ corresponding to the correctly received PDCP PDU at the RLC layer of the secondary wireless access device, in addition to instructing the RLC layer of the master wireless access device to stop the RLC PDU ARQ corresponding to the correctly received PDCP PDU at the RLC layer.

With reference to the seventh possible implementation of the first aspect, in a twelfth possible implementation of the first aspect, when the duplication operation is executed, the method further includes: the UE sends a PDCP PDU to each wireless access device on a respective link of the wireless access device; and the UE receives a PDCP status report sent by the master wireless access device, where when the wireless access device includes the master wireless access device and a secondary wireless access device, the PDCP status report is used to instruct the UE to: notify an RLC layer corresponding to the master wireless access device and an RLC layer corresponding to each secondary wireless access device executing the duplication operation of an SN corresponding to a correctly received PDCP PDU; and instruct the RLC layer corresponding to the master wireless access device and the RLC layer corresponding to each secondary wireless access device executing the duplication operation to stop an RLC PDU ARQ corresponding to the correctly received PDCP PDU at the RLC layer; or when the wireless access device includes a secondary wireless access device, the PDCP status report is used to instruct the UE to: notify an RLC layer corresponding to each secondary wireless access device executing the duplication operation of an SN corresponding to a correctly received PDCP PDU; and instruct the RLC layer corresponding to each secondary wireless access device executing the duplication operation to stop an RLC PDU ARQ corresponding to the correctly received PDCP PDU at the RLC layer.

When the duplication operation is executed, the UE sends same PDCP PDUs on a plurality of links and the master wireless access device reports the PDCP status report to the UE. To reduce air interface overheads and reduce a data transmission delay, a PDCP layer of the UE needs to instruct the RLC layer corresponding to each secondary wireless access device executing the duplication operation to stop the RLC PDU ARQ corresponding to the correctly received PDCP PDU at the RLC layer of the secondary wireless access device, in addition to instructing the RLC layer corresponding to the master wireless access device to stop the RLC PDU ARQ corresponding to the correctly received PDCP PDU at the RLC layer.

In a thirteenth implementation of the first aspect, a predetermined rule is selecting a link with best quality, or selecting a link with a highest transmission speed, or selecting a link with most stable link quality.

According to a second aspect, a data transmission method is provided. The method includes: the wireless access device generates first indication information, where the first indication information is activation indication information or deactivation indication information, the activation indication information is used to instruct a user equipment (UE) to execute a processing operation, the deactivation indication information is used to instruct the UE to stop the processing operation, and the processing operation includes at least one of a duplication operation and a switching operation; and sends the first indication information to the UE; where the duplication operation means transmitting same data through a plurality of links; and the switching operation means selecting one from a plurality of links to perform data transmission.

When the UE executes the duplication operation, the UE transmits same data through a plurality of links. In this way, a link with relatively good link signal quality in the plurality of links may be used to improve reliability of the data transmission. When the UE executes the switching operation, the UE selects one from a plurality of links to perform data transmission. The selected link usually has relatively good quality. Therefore, reliability of the data transmission can also be improved. This resolves a problem that existing single-link data transmission cannot ensure high reliability for URLLC, and meets a URLLC service requirement.

When no processing operation needs to be executed, a master wireless access device sends the deactivation indication information to the UE, to instruct the UE to stop the processing operation, thereby reducing additional resource overheads caused by data transmission performed through the processing operation.

In a first possible implementation of the second aspect, the method further includes: the wireless access device sends an execution condition to the UE, where the execution condition is used by the UE to determine whether to execute the processing operation.

In a second possible implementation of the second aspect, the method further includes: the wireless access device sends a first threshold to the UE, where the first threshold is used by the UE to determine to execute the duplication operation or the switching operation.

In a third possible implementation of the second aspect, the method further includes: the wireless access device sends second indication information to the UE, where the second indication information is associated with the first indication information; and the second indication information is used to indicate an SRB established based on links and/or a DRB established based on links.

With reference to the third possible implementation of the second aspect, in a fourth possible implementation of the second aspect, the method further includes: when the wireless access device is applied to a DC scenario or an MC scenario, and the wireless access device is a master wireless access device, the master wireless access device sends third indication information to a secondary wireless access device, where the third indication information is used to instruct the secondary wireless access device to perform a radio resource configuration for an SRB; the master wireless access device receives configuration information of the SRB that is sent by the secondary wireless access device; and the master wireless sends the configuration information to the UE.

Because New Radio (NR) of a 5G system operates at a high frequency, there is a severe shadow effect and a condition of a sharp channel change. Consequently, frequent radio link failures (RLF) may be caused and reliability of a control plane cannot be ensured. In this embodiment, the UE not only establishes a Radio Resource Control (RRC) connection to the master wireless access device, but also establishes an RRC connection to the secondary wireless access device, thereby ensuring the reliability of the control plane.

With reference to the third possible implementation of the second aspect, in a fifth possible implementation of the second aspect, the method further includes: the wireless access device sends a DRB identifier to the UE, wherein links corresponding to a DRB indicated by the DRB identifier is selected to execute the processing operation, and the DRB identifier is associated with the first indication information.

Optionally, the wireless access device further sends an SRB identifier to the UE, wherein links corresponding to an SRB indicated by the SRB identifier is selected to execute the processing operation, and the SRB identifier is associated with the first indication information.

In a sixth possible implementation of the second aspect, the method further includes: the wireless access device receives capability information sent by the UE, where the capability information is used to indicate whether the UE supports the processing operation.

The UE sends the capability information to the wireless access device to indicate whether the UE supports the processing operation. After determining that the UE supports the processing operation, the wireless access device sends the first indication information to the UE, thereby avoiding a resource waste caused by sending the first indication information to the UE when the UE does not support the processing operation.

With reference to any one of the second aspect to the sixth possible implementation of the second aspect, in a seventh possible implementation of the second aspect, when the wireless access device is applied to a CA scenario, the method further includes: the wireless access device sends cell identification information to the UE, where a serving cell indicated by the cell identification information is a serving cell for performing the duplication operation; or the wireless access device sends a cell quantity and a second threshold to the UE, where a serving cell whose link signal quality is greater than the second threshold is a serving cell for performing the duplication operation, and a total quantity of all selected serving cells does not exceed the cell quantity; or the wireless access device sends downlink data to the UE, where a serving cell that sends the downlink data to the UE is a serving cell for performing the duplication operation.

Selecting the serving cell whose link signal quality is greater than the second threshold as the serving cell for performing the duplication operation can further improve reliability of the data transmission.

With reference to any one of the second aspect to the sixth possible implementation of the second aspect, in an eighth possible implementation of the second aspect, when the wireless access device is applied to a DC scenario or an MC scenario, and the wireless access device is a master wireless access device, the method further includes: the master wireless access device sends secondary wireless access device identification information to the UE, where a secondary wireless access device indicated by the secondary wireless access device identification information is a wireless access device for performing the duplication operation; or the master wireless access device sends a wireless access device quantity and a third threshold to the UE, where a wireless access device whose link signal quality is greater than the third threshold is a wireless access device for performing the duplication operation, and a total quantity of all selected wireless access devices does not exceed the wireless access device quantity; or the master wireless access device sends downlink data to the UE, where a wireless access device that sends the downlink data to the UE is a wireless access device for performing the duplication operation.

Selecting the wireless access device whose link signal quality is greater than the third threshold as the wireless access device for performing the duplication operation can further improve reliability of the data transmission.

With reference to the eighth possible implementation of the second aspect, in a ninth possible implementation of the second aspect, when the duplication operation is executed, the method further includes: the master wireless access device receives a first BSR sent by the UE, where the first BSR includes a product obtained by multiplying a data volume at a PDCP layer of the master wireless access device by a quantity of wireless access devices executing the duplication operation and a sum of data volumes at respective RLC layers corresponding to the master wireless access device and each secondary wireless access device; and the master wireless access device negotiates with each secondary wireless access device receiving the first BSR on an uplink resource of the UE.

With reference to the eighth possible implementation of the second aspect, in a tenth possible implementation of the second aspect, when the duplication operation is executed, the method further includes: the master wireless access device receives a second BSR sent by the UE; and when the second BSR includes a product obtained by multiplying a data volume at a PDCP layer of the master wireless access device by a quantity of wireless access devices executing the duplication operation and a sum of data volumes at respective RLC layers of the master wireless access device and each secondary wireless access device, the master wireless access device determines based on the second BSR, an uplink resource to be allocated to the UE, subtracts a volume of the uplink resources from a volume indicated in the second BSR to obtain a remaining quantity of requested uplink resources, and sends the remaining quantity of requested uplink resources to the secondary wireless access device, where the remaining quantity of requested uplink resources is used to instruct the secondary wireless access device to determine an uplink resource to be allocated to the UE; or when the second BSR includes a smaller value between a sum of a data volume at a PDCP layer of the master wireless access device and a data volume at an RLC layer of each secondary wireless access device and a sum of the data volume at the PDCP layer and a data volume at an RLC layer of the master wireless access device, the master wireless access device determines based on the second BSR, an uplink resource to be allocated to the UE, and forwards the second BSR to each secondary wireless access device, where the second BSR is used to instruct each secondary wireless access device to determine an uplink resource to be allocated to the UE.

With reference to the eighth possible implementation of the second aspect, in an eleventh possible implementation of the second aspect, when the duplication operation is executed, the method further includes: the master wireless access device receives a remaining quantity of requested uplink resources that is sent by one of secondary wireless access devices, where the remaining quantity of requested uplink resources is obtained by the secondary wireless access device by subtracting a volume of uplink resources allocated by the secondary wireless access device to the UE from a volume indicated in a second BSR sent by the UE; and determines based on the remaining quantity of requested uplink resources, an uplink resource to be allocated to the UE; or the master wireless access device receives a second BSR sent by one of secondary wireless access devices, where the second BSR is a second BSR sent by the UE to the secondary wireless access device, and determines, based on the second BSR, an uplink resource to be allocated to the UE, where the secondary wireless access device is a secondary wireless access device that sends a UL grant to the UE, and the UE is configured to send the second BSR to the secondary wireless access device on an uplink resource indicated by the UL grant.

With reference to the eighth possible implementation of the second aspect, in a twelfth possible implementation of the second aspect, when the duplication operation is executed, the method further includes: the master wireless access device receives a third BSR sent by the UE, where the third BSR includes a sum of data volumes at a PDCP layer and an RLC layer of the master wireless access device; and determines based on the third BSR, an uplink resource to be allocated to the UE.

With reference to the eighth possible implementation of the second aspect, in a thirteenth possible implementation of the second aspect, when the duplication operation is executed, the method further includes: the master wireless access device receives a PDCP status report sent by the UE; and when the master wireless access device sends a PDCP PDU to the UE on a link, the master wireless access device notifies an RLC layer of the master wireless access device and an RLC layer of each secondary wireless access device executing the duplication operation of an SN corresponding to a PDCP PDU correctly received by the UE, and instructs the RLC layer of the master wireless access device and the RLC layer of each secondary wireless access device executing the duplication operation to stop an RLC PDU ARQ corresponding to the correctly received PDCP PDU at the RLC layer; or when the master wireless access device does not send a PDCP PDU to the UE, the master wireless access device notifies an RLC layer of each secondary wireless access device executing the duplication operation of a sequence number SN corresponding to a PDCP PDU correctly received by the UE, and instructs the RLC layer of each secondary wireless access device executing the duplication operation to stop an RLC PDU ARQ corresponding to the correctly received PDCP PDU at the RLC layer.

When the duplication operation is executed, the UE receives same PDCP PDUs on a plurality of links and the UE reports the PDCP status report to the master wireless access device. To reduce air interface overheads and reduce a data transmission delay, the PDCP layer of the master wireless access device needs to instruct the RLC layer of each secondary wireless access device to stop the RLC PDU corresponding to the correctly received PDCP PDU at the RLC layer of the secondary wireless access device, in addition to instructing the RLC layer of the master wireless access device to stop the RLC PDU ARQ corresponding to the correctly received PDCP PDU at the RLC layer.

With reference to the eighth possible implementation of the second aspect, in a fourteenth possible implementation of the second aspect, when the duplication operation is executed, the method further includes: the master wireless access device receives a PDCP PDU, and the master wireless access device sends a PDCP status report to the UE, where when the PDCP PDU is sent on a respective link by each of the UE and each secondary wireless access device executing the duplication operation, the PDCP status report is used to instruct the UE to: notify an RLC layer corresponding to the master wireless access device and an RLC layer corresponding to each secondary wireless access device executing the duplication operation of an SN corresponding to a correctly received PDCP PDU; and instruct the RLC layer corresponding to the master wireless access device and the RLC layer corresponding to each secondary wireless access device executing the duplication operation to stop an RLC PDU ARQ corresponding to the correctly received PDCP PDU at the RLC layer; or when the PDCP PDU is sent on a respective link by each secondary wireless access device executing the duplication operation, the PDCP status report is used to instruct the UE to: notify an RLC layer corresponding to each secondary wireless access device executing the duplication operation of an SN corresponding to a correctly received PDCP PDU; and instruct the RLC layer corresponding to each secondary wireless access device executing the duplication operation to stop an RLC PDU ARQ corresponding to the correctly received PDCP PDU at the RLC layer.

When the duplication operation is executed, the UE sends same PDCP PDUs on a plurality of links and the master wireless access device reports the PDCP status report to the UE. To reduce air interface overheads and reduce a data transmission delay, a PDCP layer of the UE needs to instruct the RLC layer corresponding to each secondary wireless access device executing the duplication operation to stop the RLC PDU corresponding to the correctly received PDCP PDU at the RLC layer of the secondary wireless access device, in addition to instructing the RLC layer corresponding to the master wireless access device to stop the RLC PDU ARQ corresponding to the correctly received PDCP PDU at the RLC layer.

According to a third aspect, a data transmission apparatus is provided. The apparatus includes at least one unit, and the at least one unit is configured to implement the data transmission method provided in the first aspect or at least one implementation of the first aspect.

According to a fourth aspect, a data transmission apparatus is provided. The apparatus includes at least one unit, and the at least one unit is configured to implement the data transmission method provided in the second aspect or at least one implementation of the second aspect.

According to a fifth aspect, a data transmission apparatus is provided. The apparatus includes a processor and a transceiver connected to the processor, the transceiver is configured to be controlled by the processor, and the processor is configured to implement the data transmission method provided in the first aspect or at least one implementation of the first aspect.

According to a sixth aspect, a data transmission apparatus is provided. The apparatus includes a processor and a transceiver connected to the processor, the transceiver is configured to be controlled by the processor, and the processor is configured to implement the data transmission method provided in the second aspect or at least one implementation of the second aspect.

DESCRIPTION OF EMBODIMENTS

To make objectives, technical solutions, and advantages of the present application clearer, the following further describes implementations of the present application in detail with reference to the accompanying drawings.

A "unit" mentioned in this specification is a functional structure divided according to logic. The "unit" may be implemented by only hardware, or implemented by a combination of software and hardware.

Figure 1:
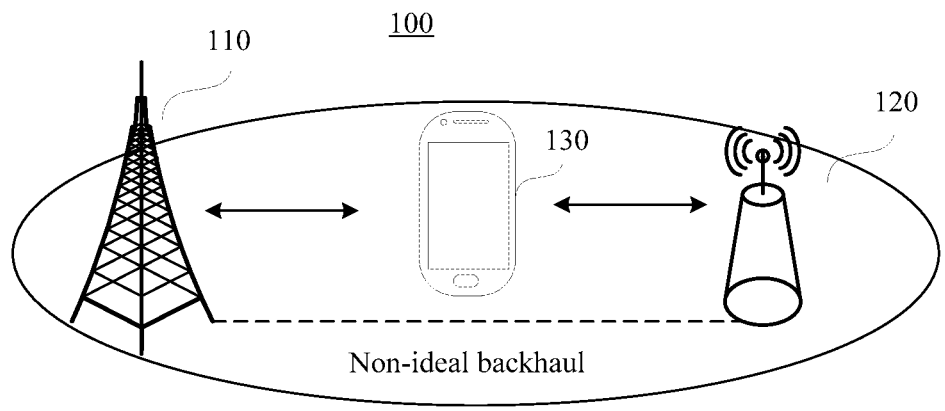
FIG. 1 is a schematic structural diagram of a data transmission system according to an embodiment of the present application.

FIG. 1 is a schematic diagram of a data transmission system 100 according to an embodiment of the present application. The data transmission system 100 includes a master wireless access device 110, at least one secondary wireless access device 120, and UE 130.

When the data transmission system 100 includes one secondary wireless access device 120, corresponding to a DC scenario, a link is established between the master wireless access device 110 and the secondary wireless access device 120, a link is established between the secondary wireless access device 120 and the UE 130, and a link is established between the master wireless access device 110 and the UE 130. When the data transmission system 100 includes at least two secondary wireless access devices 120, corresponding to an MC scenario, a link is established separately between the master wireless access device 110 and each secondary wireless access device 120, a link is established between each secondary wireless access device 120 and the UE 130, a link is established between the secondary wireless access devices 120, and a link is established between the master wireless access device 110 and the UE 130. The master wireless access device 110 may be referred to as an Master gNB (M-gNB), and the secondary wireless access device 120 may be referred to as an Secondary gNB (S-gNB). In FIG. 1, that the data transmission system 100 includes one secondary wireless access device 120 is used merely as an example for description.

In this embodiment, on a control plane, the UE 130 establishes an SRB with each of the master wireless access device 110 and the secondary wireless access device 120. A specific establishment process is described in detail below.

On a user plane, the UE 130 establishes a DRB with each of the master wireless access device 110 and the secondary wireless access device 120, and DRBs include a secondary cell group (SCG) bearer and a split bearer.

Figure 2:
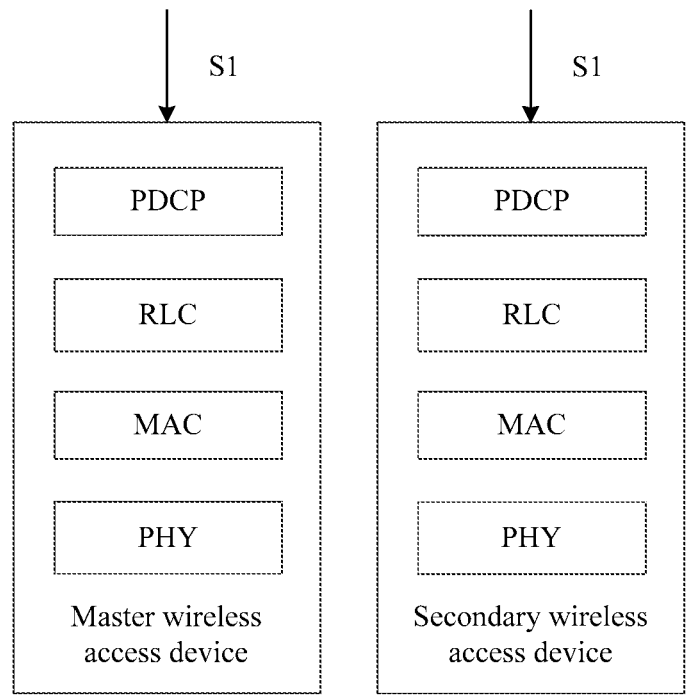
FIG. 2 is a schematic structural diagram of a 1A architecture according to an embodiment of the present application.

The SCG bearer is applied to a 1A architecture. Referring to FIG. 2, in the 1A architecture, an MeNB includes a physical (PHY) layer, a Medium Access Control (MAC) layer above the PHY layer, an RLC layer above the MAC layer, and a PDCP layer above the RLC layer; an SeNB includes a PHY layer, a MAC layer above the PHY layer, an RLC layer above the MAC layer, and a PDCP layer above the RLC layer. A network side establishes an S1 connection to each of the MeNB and the SeNB.

Figure 3:
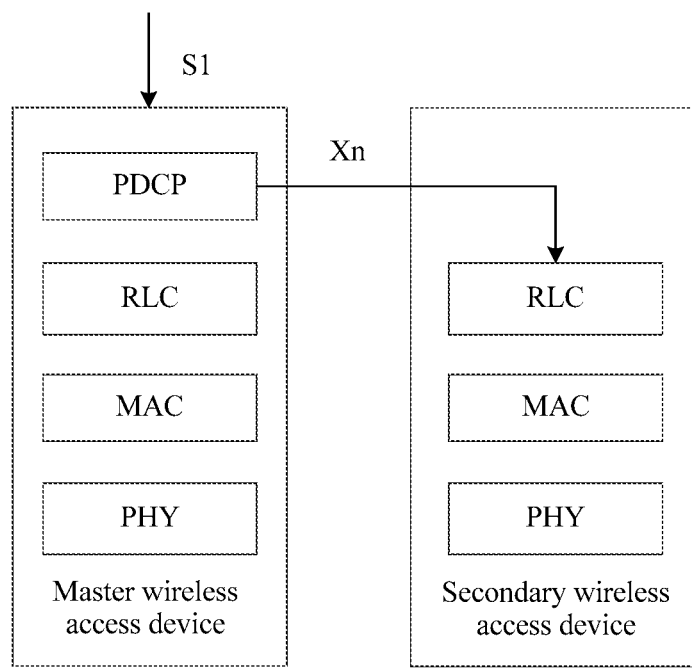
FIG. 3 is a schematic structural diagram of a 3C architecture according to an embodiment of the present application.

The split bearer is applied to a 3C architecture. Referring to FIG. 3, in the 3C architecture, an MeNB includes a PHY layer, a MAC layer above the PHY layer, an RLC layer above the MAC layer, and a PDCP layer above the RLC layer; an SeNB includes a PHY layer, a MAC layer above the PHY layer, an RLC layer above the MAC layer, and the RLC layer in the SeNB is connected to the PDCP layer in the MeNB through an Xn interface. A network side establishes an S1 connection to the MeNB.

When the data transmission system 100 is applied to a CA scenario, the data transmission system 100 may include a wireless access device and the UE 130.

Figure 4:
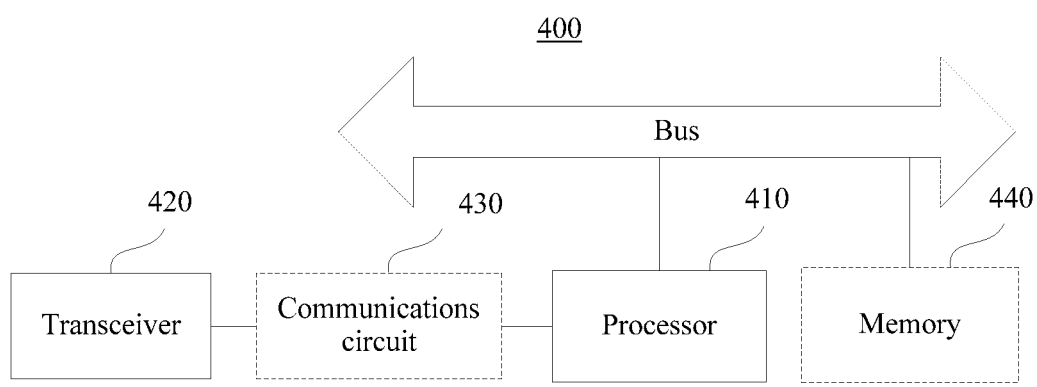
FIG. 4 is a schematic structural diagram of an electronic device according to an embodiment of the present application.

FIG. 4 is a schematic structural diagram of an electronic device 400 according to an embodiment of the present application. The electronic device 400 may be the master wireless access device 110 or the secondary wireless access device 120 or the UE 130 in FIG. 1 or the wireless access device. The electronic device 400 includes a processor 410 and a transceiver 420 connected to the processor 410.

The transceiver 420 may include one or more antennas. The antenna enables the electronic device to send or receive a radio signal.

The transceiver 420 may be connected to a communications circuit 430. The communications circuit 430 may execute various processing on a signal received or sent by the transceiver 420, for example, modulates a signal to be sent by the transceiver 420 or demodulates a signal received by the transceiver 420. During actual implementation, the communications circuit 430 may include a radio frequency (RF) chip and a baseband chip.

The communications circuit 430 may be connected to the processor 410. Alternatively, the communications circuit 430 may be integrated into the processor 410. The processor 410 is a control center of the electronic device. The processor 410 may be a central processing unit (CPU), a network processor (NP), or a combination of a CPU and an NP. The processor 410 may further include a hardware chip. The hardware chip may be an application-specific integrated circuit (ASIC), a programmable logic device (PLD), or a combination thereof. The PLD may be a complex programmable logical device (CPLD), a field programmable gate array (FPGA), generic array logic (GAL), or any combination thereof.

A memory 440 is connected to the processor 410 by using a bus or in another manner. The memory 440 may be a volatile memory, a non-volatile memory, or a combination thereof. The volatile memory may be a random access memory (RAM), for example, a static random access memory (SRAM) or a dynamic random access memory (DRAM). The non-volatile memory may be a read-only memory (ROM), for example, a programmable read-only memory (PROM), an erasable programmable read only memory (EPROM), or an electrically erasable programmable read-only memory (EEPROM). Alternatively, the non-volatile memory may be a flash memory or a disk memory, for example, a magnetic tape, a floppy disk, or a hard disk. Alternatively, the non-volatile memory may be an optical disc.

In this embodiment, when a data transmission system includes a master wireless access device and a secondary wireless access device, before a UE communicates with the master wireless access device and the secondary wireless access device, the master wireless access device needs to configure an SRB and a DRB, and instructs each secondary wireless access device to configure an SRB and a DRB. Secondary wireless access devices have a same process of configuring an SRB and a DRB. A technology of configuring the SRB and the DRB by the master wireless access device is very mature. For the technology, refer to descriptions of related technologies. A process in which the master wireless access device instructs each secondary wireless access device to configure the SRB and the DRB is described herein. For ease of description, in this embodiment, that the master wireless access device instructs one secondary wireless access device to configure the SRB and the DRB is used as an example for description.

The master wireless access device instructs the secondary wireless access device to perform radio resource configuration of the SRB and/or the DRB. The secondary wireless access device performs the radio resource configuration of the SRB and/or the DRB based on the indication of the master wireless access device, and sends generated configuration information to the UE through the master wireless access device. Table 1 is a configuration request sent by the master wireless access device to the secondary wireless access device. Table 2 is a configuration response fed back by the secondary wireless access device.

TABLE 1

| DRB configuration of the master wireless access device | EPS ID<br>DRB ID<br>PDCP configuration<br>RLC configuration<br>LC configuration |
|---|---|
| SRB configuration of the master wireless access device | SRB ID<br>RLC configuration<br>LC configuration |
| DRB that needs to be configured by the secondary wireless access device | EPS ID<br>DRB ID<br>DRB type    split<br>SCG |
| SRB that needs to be configured by the secondary wireless access device | SRB ID<br>Configuration indication |

TABLE 2

| DRB configuration of the secondary wireless access device | DRB type | DRB ID<br>split<br>SCG    EPS ID<br>PDCP configuration<br>RLC configuration<br>LC configuration |
|---|---|---|
| SRB configuration of the secondary wireless access device | | SRB ID<br>RLC configuration<br>LC configuration |

The configuration request may be implemented by using a secondary wireless access device addition request (S-gNB addition request) message. The configuration response may be implemented by using a secondary wireless access device addition response (S-gNB addition response) message.

In an existing mechanism, the DRB type indicates a bearer type of a DRB, including split and SCG. The master wireless access device instructs the secondary wireless access device to configure a split bearer or an SCG bearer by enumerating the types.

Similarly, the master wireless access device may use a same manner to instruct the secondary wireless access device to perform the SRB configuration. For example, the master wireless access device configures an SRB 1 and an SRB 2, where the SRB 1 is identified by using an SRB ID 1, and the SRB 2 is identified by using an SRB ID 2; in this case, the master wireless access device instructs, based on an SRB ID and a configuration indication, the secondary wireless access device to perform a radio resource configuration for an SRB corresponding to the SRB ID. Alternatively, the master wireless access device directly sends an SRB ID to the secondary wireless access device, and after receiving the identifier, the secondary wireless access device performs a radio resource configuration for an SRB corresponding to the SRB ID. In other words, the configuration indication in Table 1 is an optional parameter.

It should be noted that the configuration indication can indicate that the master wireless access device supports a duplication operation and/or a switching operation.

When the data transmission system is applied to a 5G system, NR works at a high frequency, and there is a severe shadow effect and a condition of a sharp channel change. Consequently, frequent RLFs may be caused and reliability of a control plane cannot be ensured. In this embodiment, the UE not only establishes an RRC connection to the master wireless access device, but also establishes an RRC connection to the secondary wireless access device, thereby ensuring the reliability of the control plane.

Figure 5:
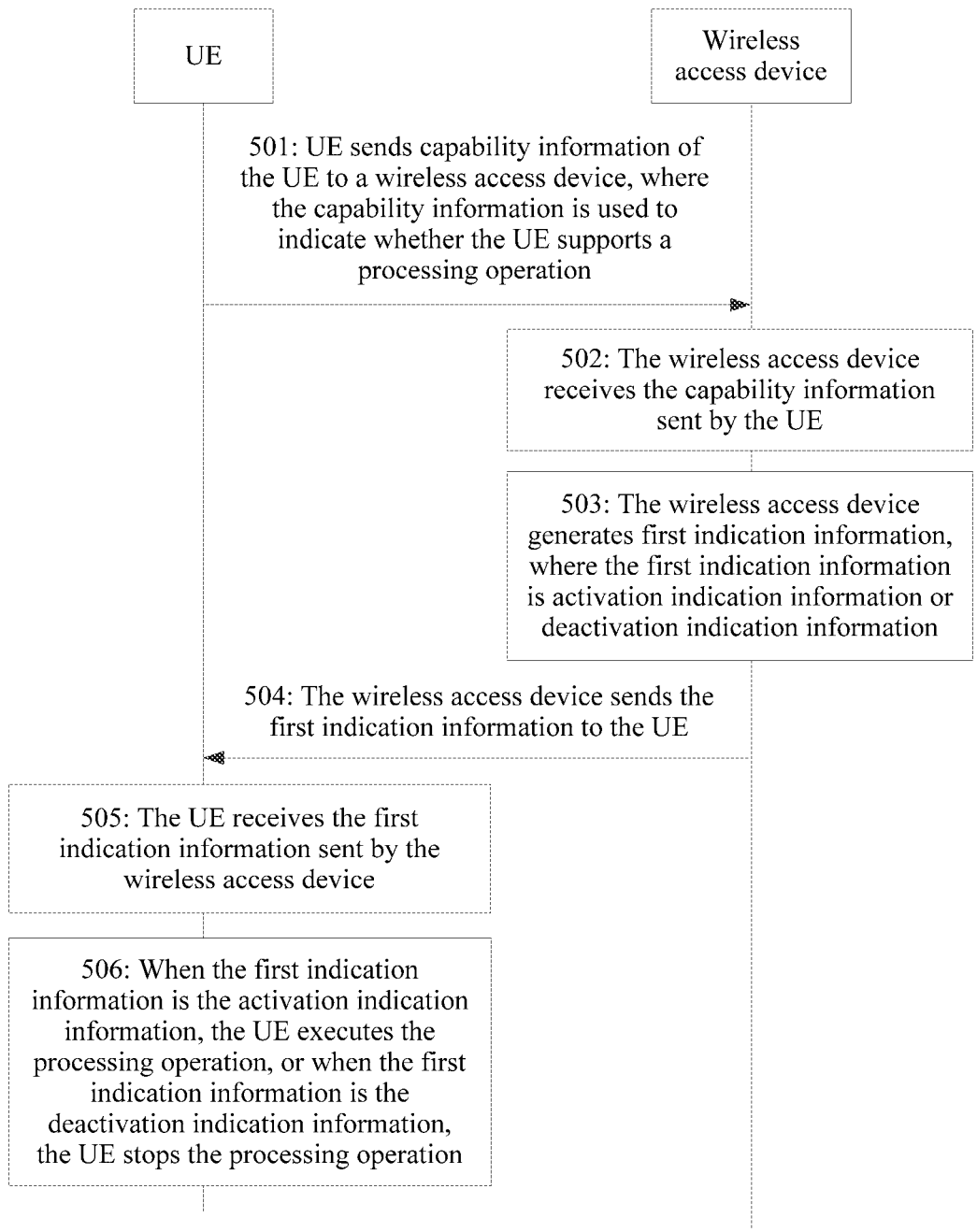
FIG. 5 is a flowchart of a data transmission method according to an embodiment of the present application.

FIG. 5 is a flowchart of a data transmission method according to an embodiment of the present application. In this embodiment, that the method is applied to the data transmission system shown in FIG. 1 is used as an example for description. The wireless access device 110 and the UE 130 execute the following steps. The method includes the following several steps.

Step 501: The UE sends capability information of the UE to the wireless access device, where the capability information is used to indicate whether the UE supports a processing operation.

The processing operation includes at least one of a duplication operation and a switching operation.

The duplication operation means transmitting same data through a plurality of links. The duplication operation herein may also be referred to as a duplication operation. For example, when the wireless access device is applied to a DC scenario or an MC scenario, the data transmission system includes a master wireless access device and a secondary wireless access device. The UE establishes a link with each of one master wireless access device and n (n is a positive integer) secondary wireless access devices. The UE may send same uplink data through the link of the master wireless access device and the links of the plurality of the secondary wireless access devices, or the UE may receive same downlink data through the link of the master wireless access device and the links of the plurality of the secondary wireless access devices. For another example, when the wireless access device is applied to a CA scenario, the data transmission system includes the wireless access device. The UE establishes links with a plurality of serving cells of the wireless access device. The UE sends same uplink data through the plurality of links, or may receive same downlink data through the plurality of links.

The switching operation means selecting one from a plurality of links to perform data transmission. The switching operation may also be referred to as a switching operation herein. For example, when the wireless access device is applied to a DC scenario or an MC scenario, the data transmission system includes a master wireless access device and a secondary wireless access device. The UE establishes a link with each of one master wireless access device and n (n is a positive integer) secondary wireless access devices, and selects one from a plurality of links to send uplink data or receive downlink data. For another example, when the wireless access device is applied to a CA scenario, the data transmission system includes the wireless access device. The UE establishes links with a plurality of serving cells of the wireless access device. The UE selects one from the plurality of links to send uplink data or receive downlink data.

Optionally, the switching operation may further mean selecting one from a plurality of links according to a predetermined rule to perform data transmission. The predetermined rule may be selecting a link with best quality, or selecting a link with a highest transmission speed, or selecting a link with most stable link quality. In this way, the UE may select one link based on a requirement, to improve data transmission reliability or increase a transmission speed.

Some UEs support the processing operation but some UEs do not. Therefore, the UE further needs to indicate, in the generated capability information, whether the UE supports the processing operation, and sends the capability information to the wireless access device, so that the wireless access device can clarify whether the UE supports the processing operation.

Step 502: The wireless access device receives the capability information sent by the UE.

Step 503: The wireless access device generates first indication information, where the first indication information is activation indication information or deactivation indication information.

The activation indication information is used to instruct the UE to execute the processing operation, and the deactivation indication information is used to instruct the UE to stop the processing operation. In this way, when the processing operation does not need to be executed, the UE can be instructed to stop the processing operation, thereby reducing a resource waste caused by data transmission performed through the processing operation.

Step 504: The wireless access device sends the first indication information to the UE.

The wireless access device may add the first indication information to a MAC control element (CE) or an RRC message to send to the UE, or the wireless access device may add the first indication information to another message to send to the UE, or the wireless access device may separately send the first indication information. No limitation is imposed in this embodiment.

Step 505: The UE receives the first indication information sent by the wireless access device.

Step 506: When the first indication information is the activation indication information, the UE executes the processing operation, or when the first indication information is the deactivation indication information, the UE stops the processing operation.

It should be noted that, as another possible implementation, in embodiments of the present application, a solution in which the UE executes the processing operation when the first indication information is the activation indication information is parallel with a solution in which the UE stops the processing operation when the first indication information is the deactivation indication information, and an execution sequence is not limited. When the first indication information is the deactivation indication information and the UE stops the processing operation, that the first indication information is the activation indication information and the UE executes the processing operation is an optional implementation solution. Likewise, when the first indication information is the activation indication information and the UE executes the processing operation, that the first indication information is the deactivation indication information and the UE stops the processing operation is a further optional implementation solution. For example, when a piece of indication information received by the UE is the activation indication information, the UE executes the processing operation; or when a piece of indication information received by the UE is the deactivation indication information, an operation of the UE may be not limited. Similarly, when a piece of indication information received by the UE is the deactivation indication information, the UE stops the processing operation; or when a piece of indication information received by the UE is the activation indication information, an operation of the UE may be not limited.

In an activation scenario, the activation indication information is used to instruct the UE to execute the processing operation, but the UE cannot determine when to execute the processing operation. Therefore, the wireless access device may send an execution condition to the UE, so that the UE determines, based on the execution condition, when to execute the processing operation.

Specifically, the wireless access device sends the execution condition to the UE, where the execution condition is used by the UE to determine whether to execute the processing operation. Correspondingly, the UE receives the execution condition sent by the wireless access device. In this case, "the UE executes the processing operation" in step 506 may be replaced by the following: When the UE meets the execution condition, the UE executes the processing operation.

The execution condition may be used to indicate a signal quality threshold or a data volume threshold. For example, in a case with the execution condition indicating the signal quality threshold, the UE executes the processing operation when signal quality is less than the signal quality threshold, and does not execute the processing operation when the signal quality is greater than the signal quality threshold; or the UE executes the processing operation when signal quality is greater than the signal quality threshold, and does not execute the processing operation when the signal quality is less than the signal quality threshold. In a case with the execution condition indicating the data volume threshold, the UE executes the processing operation when a data volume of to-be-sent uplink data is less than the data volume threshold, and does not execute the processing operation when the data volume is greater than the data volume threshold; or the UE executes the processing operation when the data volume is greater than the data volume threshold, and does not execute the processing operation when the data volume is less than the data volume threshold.

In an activation scenario, the activation indication information is used to instruct the UE to execute the processing operation, but the UE cannot determine when to execute the duplication operation and when to execute the switching operation. Therefore, the wireless access device may send a first threshold to the UE, so that the UE determines, based on the first threshold, to execute the duplication operation or the switching operation.

Specifically, the wireless access device sends the first threshold to the UE. Correspondingly, the UE receives the first threshold sent by the wireless access device. In this case, "the UE executes the processing operation" in step 506 may be replaced by the following: The UE determines a data volume of to-be-sent uplink data; and the UE executes the duplication operation when the data volume is less than the first threshold, and the UE executes the switching operation when the data volume is greater than the first threshold; or the UE executes the duplication operation when the data volume is greater than the first threshold, and the UE executes the switching operation when the data volume is less than the first threshold.

Optionally, the wireless access device may add the first threshold to the activation indication information to send to the UE, or the wireless access device may add the first threshold and the activation indication information together to another message to send to the UE, or the wireless access device may separately send the first threshold to the UE. No limitation is imposed in this embodiment.

In an activation scenario, the activation indication information is used to instruct the UE to execute the processing operation, but the UE cannot determine to select links corresponding to an SRB to execute the processing operation or select links corresponding to a DRB to execute the processing operation. Therefore, the wireless access device further needs to send second indication information to the UE, so that the UE determines, based on the second indication information, wherein the links corresponding to the SRB is selected to execute the processing operation or the links corresponding to the DRB is selected to execute the processing operation.

Specifically, the wireless access device sends the second indication information to the UE, where the second indication information is used to indicate an SRB and/or a DRB, and the second indication information is associated with the first indication information. Correspondingly, the UE receives the second indication information sent by the wireless access device. In this case, "the UE executes the processing operation" in step 506 may be replaced by the following: When the second indication information indicates an SRB, the UE selects links corresponding to the SRB to execute the processing operation; or when the second indication information indicates a DRB, the UE selects links corresponding to the DRB to execute the processing operation.

Optionally, when the first indication information is the activation indication information, that the second indication information is associated with the first indication information means that the second indication information is carried in the activation indication information, and in this case, the wireless access device may add the second indication information to the activation indication information to send to the UE; or that the second indication information is associated with the first indication information means that the second indication information and the activation indication information are carried in a same message, and in this case, the wireless access device may add the second indication information and the activation indication information together to another message to send to the UE; or that the second indication information is associated with the first indication information means that there is a correspondence between the second indication information and the first indication information, and in this case, the wireless access device may separately send the second indication information to the UE. No limitation is imposed in this embodiment.

There may be a plurality of DRBs configured between the wireless access device and the UE, and the processing operation needs to be executed on links corresponding to some DRBs and the processing operation does not need to be executed on links corresponding to the other DRBs. Therefore, the wireless access device further needs to send a DRB identifier to the UE, and the DRB identifier is associated with the first indication information, so that the UE determines, based on the DRB identifier, a specific DRB whose corresponding link is to be selected to execute the processing operation. The DRB identifier is used to indicate a DRB.

Specifically, this implementation further includes the following steps: The wireless access device sends a DRB identifier to the UE. Correspondingly, the UE receives the DRB identifier sent by the wireless access device. In this case, "the UE selects links corresponding to the DRB to execute the processing operation" may be replaced by the following: The UE selects links corresponding to a DRB indicated by the DRB identifier to execute the processing operation.

When the first indication information is the activation indication information, that the DRB identifier is associated with the first indication information means that the DRB identifier is carried in the activation indication information, and in this case, the wireless access device may add the DRB identifier to the activation indication information to send to the UE; or that the DRB identifier is associated with the first indication information means that the DRB identifier and the activation indication information are carried in a same message, and in this case, the wireless access device may add the DRB identifier and the activation indication information together to another message to send to the UE; or that the DRB identifier is associated with the first indication information means that there is a correspondence between the DRB identifier and the first indication information, and in this case, the wireless access device may separately send the DRB identifier to the UE. No limitation is imposed in this embodiment.

Similarly, there may be a plurality of SRBs configured between the wireless access device and the UE, and the processing operation needs to be executed on links corresponding to some SRBs and the processing operation does not need to be executed on links corresponding to the other SRBs. Therefore, the wireless access device further needs to send an SRB identifier to the UE, and the SRB identifier is associated with the first indication information, so that the UE determines, based on the SRB identifier, a specific SRB whose corresponding link is to be selected to execute the processing operation. The SRB identifier is used to indicate an SRB.

Specifically, this implementation further includes the following steps: The wireless access device sends an SRB identifier to the UE. Correspondingly, the UE receives the SRB identifier sent by the wireless access device. In this case, "the UE selects links corresponding to the SRB to execute the processing operation" may be replaced by the following: The UE selects links corresponding to an SRB indicated by the SRB identifier to execute the processing operation.

When the first indication information is the activation indication information, that the SRB identifier is associated with the first indication information means that the SRB identifier is carried in the activation indication information, and in this case, the wireless access device may add the SRB identifier to the activation indication information to send to the UE; or that the SRB identifier is associated with the first indication information means that the SRB identifier and the activation indication information are carried in a same message, and in this case, the wireless access device may add the SRB identifier and the activation indication information together to another message to send to the UE; or that the SRB identifier is associated with the first indication information means that there is a correspondence between the SRB identifier and the first indication information, and in this case, the wireless access device may separately send the SRB identifier to the UE. No limitation is imposed in this embodiment.

When the wireless access device is applied to a CA scenario, the data transmission system includes the wireless access device. Before executing the duplication operation, the UE further needs to determine which serving cell supports the duplication operation. In this embodiment, three manners of selecting a serving cell that supports the duplication operation are provided. The following describes the three selection manners separately.

(1) In a first selection manner, the wireless access device sends cell identification information to the UE. Correspondingly, the UE receives the cell identification information sent by the wireless access device, where a serving cell indicated by the cell identification information is a serving cell for performing the duplication operation.

Specifically, the wireless access device may add the cell identification information to the activation indication information to send to the UE, or the wireless access device may add the cell identification information and the activation indication information together to another message to send to the UE, or the wireless access device may separately send the cell identification information to the UE. No limitation is imposed in this embodiment.

(2) In a second selection manner, the wireless access device sends a cell quantity and a second threshold to the UE. Correspondingly, the UE receives the cell quantity and the second threshold that are sent by the wireless access device, and selects a serving cell whose link signal quality is greater than the second threshold as a serving cell for performing the duplication operation, where a total quantity of selected serving cells does not exceed the cell quantity.

Because the serving cell whose link signal quality is greater than the second threshold performs the duplication operation, and the total quantity of serving cells performing the duplication operation does not exceed the cell quantity, the UE selects, based on these two conditions, the serving cell for performing the duplication operation.

When the total quantity of the serving cells whose link signal quality is greater than the second threshold exceeds the cell quantity, the UE may sort the serving cells in a sequence from good link signal quality to poor link signal quality, and select a serving cell that is ranked ahead, or the UE may randomly select a serving cell, where a total quantity of selected serving cells does not exceed the cell quantity.

The wireless access device may add the cell quantity and the second threshold to the activation indication information to send to the UE, or the wireless access device may add the cell quantity, the second threshold, and the activation indication information together to another message to send to the UE, or the wireless access device may separately send the cell quantity and the second threshold to the UE. No limitation is imposed in this embodiment.

(3) In a third selection manner, the wireless access device sends downlink data to the UE. Correspondingly, the UE determines a serving cell that sends the downlink data to the UE as a serving cell for performing the duplication operation.

The UE determines a serving cell from which the UE receives the downlink data as the serving cell for performing the duplication operation.

When the wireless access device is applied to a DC scenario or an MC scenario, the data transmission system includes a master wireless access device and a secondary wireless access device. Different wireless access devices may have configured a same SRB and/or DRB. Therefore, before executing the duplication operation, the UE further needs to determine which wireless access device supports the duplication operation. In this embodiment, three manners of selecting a wireless access device that supports the duplication operation are provided. The following describes the three selection manners separately.

(1) In a first selection manner, the master wireless access device sends secondary wireless access device identification information to the UE. Correspondingly, the UE receives the secondary wireless access device identification information sent by the master wireless access device, and determines a secondary wireless access device indicated by the secondary wireless access device identification information as a wireless access device for performing the duplication operation.

Specifically, the master wireless access device may add the secondary wireless access device identification information to the activation indication information to send to the UE, or the master wireless access device may add the secondary wireless access device identification information and the activation indication information together to another message to send to the UE, or the master wireless access device may separately send the secondary wireless access device identification information to the UE. No limitation is imposed in this embodiment.

(2) In a second selection manner, the master wireless access device sends a wireless access device quantity and a third threshold to the UE. Correspondingly, the UE receives the wireless access device quantity and the third threshold that are sent by the master wireless access device, and selects a wireless access device whose link signal quality is greater than the second threshold as a wireless access device for performing the duplication operation, where a total quantity of selected wireless access devices does not exceed the wireless access device quantity.

Because the wireless access device whose link signal quality is greater than the third threshold performs the duplication operation, and the total quantity of wireless access devices performing the duplication operation cannot exceed the wireless access device quantity, the UE selects, based on these two conditions, the wireless access device for performing the duplication operation.

When the total quantity of the wireless access devices whose link signal quality is greater than the third threshold exceeds the wireless access device quantity, the UE may sort the wireless access devices in a sequence from good link signal quality to poor link signal quality, and select a wireless access device that is ranked ahead, or the UE may randomly select a wireless access device, where a total quantity of selected wireless access devices does not exceed the wireless access device quantity.

The master wireless access device may add the wireless access device quantity and the third threshold to the activation indication information to send to the UE, or the master wireless access device may add the wireless access device quantity, the third threshold, and the activation indication information together to another message to send to the UE, or the master wireless access device may separately send the wireless access device quantity and the third threshold to the UE. No limitation is imposed in this embodiment.

(3) In a third selection manner, the master wireless access device sends downlink data to the UE. Correspondingly, the UE determines a wireless access device that sends the downlink data to the UE as the wireless access device for performing the duplication operation.

The UE determines a wireless access device from which the UE receives the downlink data as the wireless access device for performing the duplication operation.

When the wireless access device is applied to a DC scenario or an MC scenario, the data transmission system includes a master wireless access device and a secondary wireless access device. Before executing the duplication operation, the UE further needs to send a BSR to the wireless access device, so that the wireless access device allocates an uplink resource used for performing the duplication operation to the UE. In this embodiment, four manners of sending a BSR to the wireless access device are provided. The following describes the four sending manners separately.

(1) In a first sending manner, the UE sends a first BSR separately to the master wireless access device and each secondary wireless access device, where the first BSR includes a product obtained by multiplying a data volume at a PDCP layer of the master wireless access device by a quantity of wireless access devices executing the duplication operation and a sum of data volumes at respective RLC layers corresponding to the master wireless access device and each secondary wireless access device. Correspondingly, the master wireless access device receives the first BSR sent by the UE, and negotiates with each secondary wireless access device receiving the first BSR on an uplink resource of the UE.

When the duplication operation is executed, uplink data sent by the UE is sent to both the RLC layer of the master wireless access device and the RLC layer of each secondary wireless access device. The RLC layer of each secondary wireless access device is associated with the PDCP layer of the master wireless access device. Therefore, a BSR corresponding to the master wireless access device comprises a sum of the data volumes at the PDCP layer and the RLC layer of the master wireless access device, and a BSR corresponding to each secondary wireless access device comprises a sum of the data volume at the PDCP layer of the master wireless access device and the data volume at the RLC layer of the secondary wireless access device. In this case, the first BSR includes the product obtained by multiplying the data volume at the PDCP layer of the master wireless access device by the quantity of wireless access devices executing the duplication operation and the sum of the data volumes at the respective RLC layers corresponding to the master wireless access device and each secondary wireless access device. The wireless access device includes the master wireless access device and the secondary wireless access device.

Assuming that a quantity of secondary wireless access devices is 1, the data volume at the PDCP layer of the master wireless access device is 200 bytes, the data volume at the RLC layer of the master wireless access device is 800 bytes, and the data volume at the RLC layer of the secondary wireless access device is 600 bytes, the first BSR=2×200+800+600=1800 bytes. Assuming that a quantity of secondary wireless access devices is 2, the data volume at the PDCP layer of the master wireless access device is 200 bytes, the data volume at the RLC layer of the master wireless access device is 800 bytes, a data volume at an RLC layer of a secondary wireless access device 1 is 600 bytes, and a data volume at an RLC layer of a secondary wireless access device 2 is 700 bytes, the first BSR=2×200+800+600+700=2500 bytes.

Figure 6:
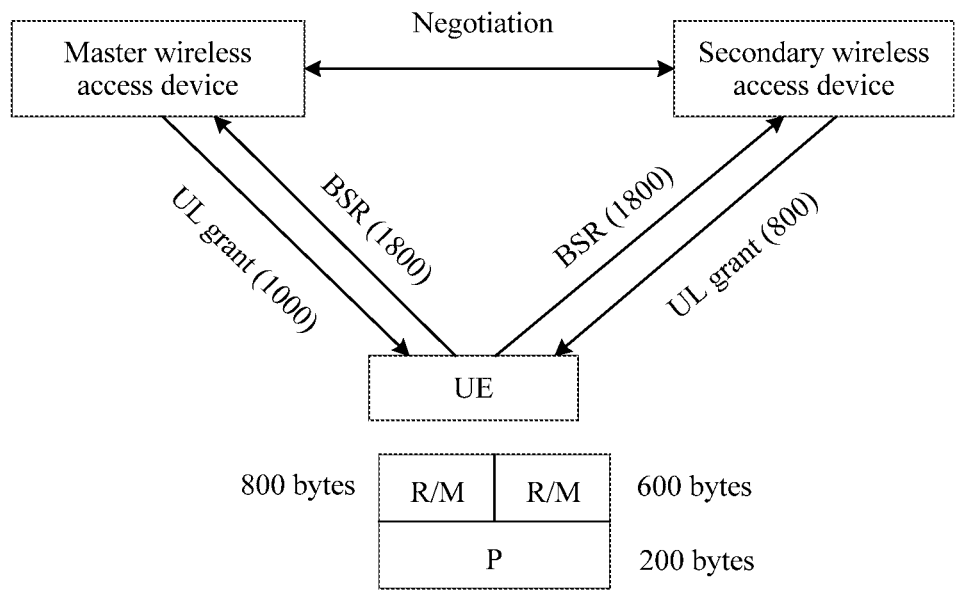
FIG. 6 is a first schematic diagram of BSR reporting according to an embodiment of the present application.

After generating the first BSR, the UE separately sends the first BSR to the master wireless access device and each secondary wireless access device. The master wireless access device negotiates with each secondary wireless access device receiving the first BSR on the uplink resource of the UE, to avoid a problem of excessive scheduling caused because each wireless access device allocates an uplink resource corresponding to the first BSR to the UE, thereby saving scheduling resources. In FIG. 6, that the UE sends the first BSR to the master wireless access device and one secondary wireless access device is used as an example for description, and the master wireless access device allocates uplink resources of 1000 bytes to the UE, and the secondary wireless access device allocates uplink resources of 800 bytes to the UE.

(2) In a second sending manner, the UE receives a UL grant sent by the master wireless access device, and sends a second BSR to the master wireless access device on an uplink resource indicated by the UL grant. Correspondingly, the master wireless access device receives the second BSR sent by the UE; and when the second BSR includes a product obtained by multiplying a data volume at a PDCP layer of the master wireless access device by a quantity of wireless access devices executing the duplication operation and a sum of data volumes at respective RLC layers of the master wireless access device and each secondary wireless access device, the master wireless access device determines, based on the second BSR, an uplink resource to be allocated to the UE, subtracts a volume of the uplink resources allocated by the master wireless access device to the UE from a volume indicated in the second BSR to obtain a remaining quantity of requested uplink resources, and sends the remaining quantity of requested uplink resources to the secondary wireless access device, where the remaining quantity of requested uplink resources is used to instruct the secondary wireless access device to determine an uplink resource to be allocated to the UE; or when the second BSR includes a smaller value between a sum of a data volume at a PDCP layer of the master wireless access device and a data volume at an RLC layer of each secondary wireless access device and a sum of the data volume at the PDCP layer and a data volume at an RLC layer of the master wireless access device, the master wireless access device determines, based on the second BSR, an uplink resource to be allocated to the UE, and forwards the second BSR to each secondary wireless access device, where the second BSR is used to instruct each secondary wireless access device to determine an uplink resource to be allocated to the UE.

Before sending the second BSR, the UE further needs to determine an uplink resource used for sending the second BSR. In a scenario, the UE requests from the wireless access device for the uplink resource used for sending the second BSR. After receiving the request, the wireless access device sends a UL grant to the UE. The UE sends the second BSR on an uplink resource indicated by the UL grant. Alternatively, in another scenario, when there is a remaining uplink resource that is used for sending uplink data and that is requested by the UE from the wireless access device, the UE sends the second BSR to the wireless access device on the uplink resource. In this case, the wireless access device may be the master wireless access device, or one or more of the secondary wireless access devices, or the master wireless access device and all of the secondary wireless access devices. No limitation is imposed in this embodiment.

In this sending manner, that the UE sends the second BSR to the master wireless access device is used as an example for description. In this case, the second BSR includes the product obtained by multiplying the data volume at the PDCP layer of the master wireless access device by the quantity of wireless access devices executing the duplication operation and the sum of the data volumes at the respective RLC layers of the master wireless access device and each secondary wireless access device; or the second BSR includes the smaller value between the sum of the data volume at the PDCP layer of the master wireless access device and the data volume at the RLC layer of each secondary wireless access device and the sum of the data volume at the PDCP layer and the data volume at the RLC layer of the master wireless access device. The following describes implementations of the two types of second BSRs separately.

When the second BSR includes the product obtained by multiplying the data volume at the PDCP layer of the master wireless access device by the quantity of wireless access devices executing the duplication operation and the sum of the data volumes at the respective RLC layers of the master wireless access device and each secondary wireless access device, for details about a calculation manner of the second BSR, refer to the description in the first sending manner. Details are not described herein again.

Figure 7:
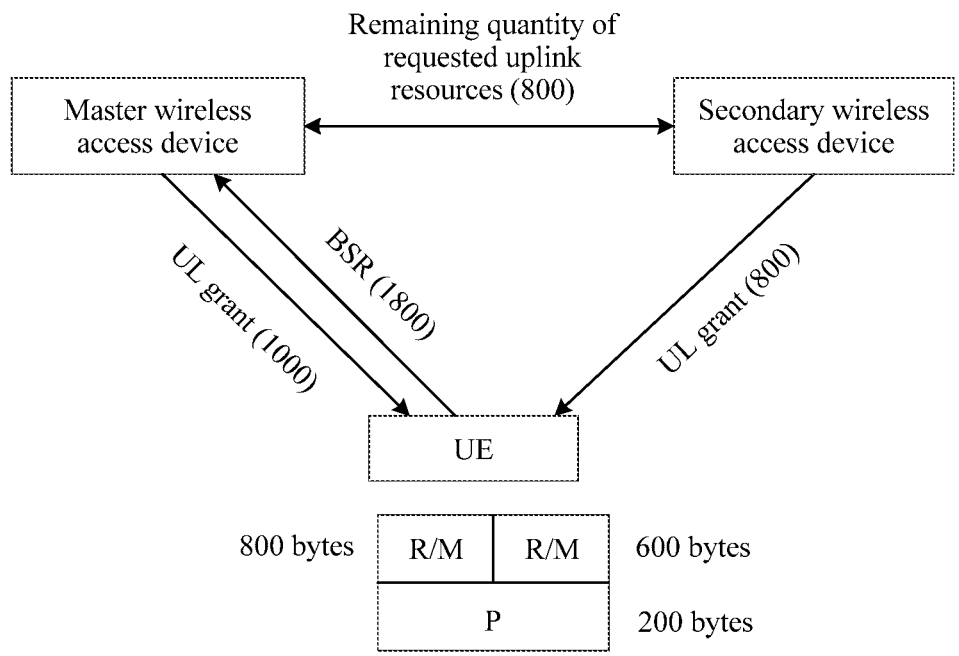
FIG. 7 is a second schematic diagram of BSR reporting according to an embodiment of the present application.

For example, the UE first receives a UL grant sent by the master wireless access device, a quantity of secondary wireless access devices is 1, and a volume in the second BSR is the 1800 bytes obtained in the first sending manner. In this case, the UE sends the second BSR to the master wireless access device. If the master wireless access device determines that the master wireless access device can allocate uplink resources of 1000 bytes to the UE, the master wireless access device calculates a remaining quantity of requested uplink resources=1800−1000=800 bytes, and sends the remaining quantity of requested uplink resources to the secondary wireless access device, so that the secondary wireless access device further allocates uplink resources of 800 bytes to the UE, as shown in FIG. 7.

It should be noted that, when the quantity of secondary wireless access devices is at least 2, the master wireless access device may send a first remaining quantity of requested uplink resources to one of the secondary wireless access devices that are allowed to execute the duplication operation. The secondary wireless access device determines, based on the first remaining quantity of requested uplink resources, that the secondary wireless access device can allocate an uplink resource to the UE, subtracts a volume of the uplink resources from the first remaining quantity of requested uplink resources, and sends an obtained second remaining quantity of requested uplink resources to one of remaining secondary wireless access devices, and by analogy, until a volume of uplink resources allocated to the UE reaches the volume indicated by the second BSR. Alternatively, optionally, the master wireless access device may further send the remaining quantity of requested uplink resources to all or some secondary wireless access devices performing the duplication operation, so that all or some of the secondary wireless access devices negotiate with each other on the uplink resource of the UE.

The second BSR may also include the smaller value between the sum of the data volume at the PDCP layer of the master wireless access device and the data volume at the RLC layer of each secondary wireless access device and the sum of the data volume at the PDCP layer and the data volume at the RLC layer of the master wireless access device.

Figure 8:
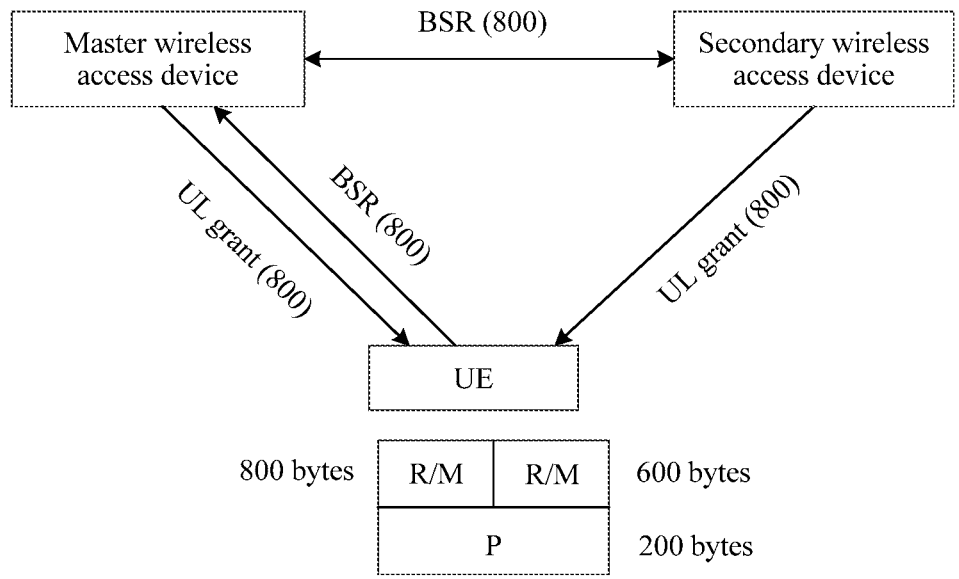
FIG. 8 is a third schematic diagram of BSR reporting according to an embodiment of the present application.

Assuming that a quantity of secondary wireless access devices is 1, the data volume at the PDCP layer of the master wireless access device is 200 bytes, the data volume at the RLC layer of the master wireless access device is 800 bytes, and the data volume at the RLC layer of the secondary wireless access device is 600 bytes, the second BSR=min{200+800, 200+600}=800 bytes. The master wireless access device allocates uplink resources of 800 bytes to the UE, and then forwards the second BSR to the secondary wireless access device, so that the secondary wireless access device allocates uplink resources of 800 bytes to the UE, as shown in FIG. 8.

(3) In a third sending manner, a secondary wireless access device sends a UL grant to the UE. Correspondingly, the UE receives a UL grant sent by one of secondary wireless access devices, and sends the second BSR to the secondary wireless access device on an uplink resource indicated by the UL grant. Correspondingly, the master wireless access device receives a remaining quantity of requested uplink resources that is sent by one of the secondary wireless access devices, where the remaining quantity of requested uplink resources is obtained by the secondary wireless access device by subtracting a volume of uplink resources allocated by the secondary wireless access device to the UE from the volume indicated by the second BSR, and determines, based on the remaining quantity of requested uplink resources, an uplink resource to be allocated to the UE; or receives a second BSR sent by one of the secondary wireless access devices, where the second BSR is sent by the UE to the secondary wireless access device, and determines, based on the second BSR, an uplink resource to be allocated to the UE.

In this sending manner, that the UE sends the second BSR to a secondary wireless access device is used as an example for description. In this case, the secondary wireless access device in this sending manner is similar to the master wireless access device in the second sending manner, and the master wireless access device in this sending manner is similar to the secondary wireless access device in the second sending manner. For implementation details, refer to the description in the second sending manner. Details are not described herein again.

It should be noted that, in the foregoing three sending manners, when the UE sends the BSR to the master wireless access device and a plurality of secondary wireless access devices, a network side needs to clarify a wireless access device performing the duplication operation; or otherwise, network-side negotiation cannot be performed.

(4) In a fourth sending manner, the UE sends a third BSR to the master wireless access device, and sends a fourth BSR to each secondary wireless access device, where the third BSR includes a sum of data volumes at a PDCP layer and an RLC layer of the master wireless access device, and the fourth BSR includes a sum of the data volume at the PDCP layer of the master wireless access device and a data volume at an RLC layer of the secondary wireless access device. Correspondingly, the master wireless access device receives the third BSR sent by the UE, and determines, based on the third BSR, an uplink resource to be allocated to the UE.

Assuming that a quantity of secondary wireless access devices is 1, the data volume at the PDCP layer of the master wireless access device is 200 bytes, the data volume at the RLC layer of the master wireless access device is 800 bytes, and the data volume at the RLC layer of the secondary wireless access device is 600 bytes, the third BSR=200+

Figure 9:
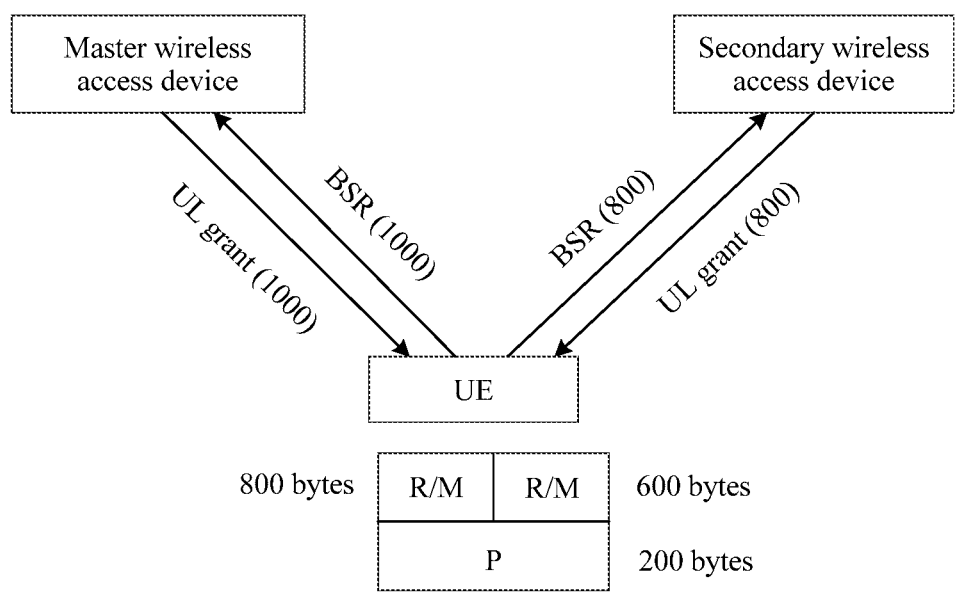
FIG. 9 is a fourth schematic diagram of BSR reporting according to an embodiment of the present application.

800=1000 bytes, and the fourth BSR=200+600=800 bytes. The UE sends the third BSR to the master wireless access device and sends the fourth BSR to the secondary wireless access device, as shown in FIG. 9.

When the wireless access device is applied to a DC scenario or an MC scenario, the data transmission system includes a master wireless access device and a secondary wireless access device. When the duplication operation is executed, the UE receives a PDCP PDU sent by each wireless access device on a respective link, and sends a PDCP status report to the master wireless access device. Correspondingly, the master wireless access device receives the PDCP status report sent by the UE. When the master wireless access device sends a PDCP PDU to the UE, the master wireless access device notifies an RLC layer of the master wireless access device and an RLC layer of each secondary wireless access device executing the duplication operation of an SN corresponding to a PDCP PDU correctly received by the UE, and instructs the RLC layer of the master wireless access device and the RLC layer of each secondary wireless access device executing the duplication operation to stop an RLC PDU ARQ corresponding to the correctly received PDCP PDU at the RLC layer; or when the master wireless access device does not send a PDCP PDU to the UE, the master wireless access device notifies an RLC layer of each secondary wireless access device executing the duplication operation of a sequence number SN corresponding to a PDCP PDU correctly received by the UE, and instructs the RLC layer of each secondary wireless access device executing the duplication operation to stop an RLC PDU ARQ corresponding to the correctly received PDCP PDU at the RLC layer.

The UE may periodically send the PDCP status report to the master wireless access device, and the master wireless access device may notify the RLC layer of each secondary wireless access device through an Xn interface.

That the master wireless access device and one secondary wireless access device send PDCP PDUs to the UE is used as an example for description. For example, the PDCP layer of the master wireless access device receives 5 downlink (DL) packets, and generates PDCP PDUs 1/2/3/4/5. The PDCP layer of the master wireless access device sends the PDCP PDUs 1/2/3/4/5 to the UE through the RLC layer/a MAC layer/a PHY layer of the master wireless access device, and the PDCP layer of the master wireless access device sends the PDCP PDUs 1/2/3/4/5 to the UE through the RLC layer/a MAC layer/a PHY layer of the secondary wireless access device. If the UE correctly receives the PDCP PDUs 1/4/5 from the master wireless access device and correctly receives the PDCP PDUs 2/5 from the secondary wireless access device, the UE re-sorts the PDCP PDUs, performs duplicate packet detection, and determines that the PDCP PDUs 1/2/4/5 are correctly received. In this case, the UE may send the PDCP status report to the master wireless access device, to notify the master wireless access device that the PDCP PDUs with the SNs 1/2/4/5 are correctly received. The PDCP layer of the master wireless access device notifies the RLC layer of the master wireless access device of the SNs, so that the RLC layer of the master wireless access device stops RLC PDU ARQs corresponding to the PDCP PDUs with the SNs 1/2/4/5 at the RLC layer. Then, the PDCP layer of the master wireless access device notifies the RLC layer of the secondary wireless access device through the Xn interface, so that the RLC layer of the secondary wireless access device stops RLC PDU ARQs corresponding to the PDCP PDUs with the SNs 1/2/4/5 at the RLC layer, thereby reducing an unnecessary resource waste.

When the wireless access device is applied to a DC scenario or an MC scenario, the data transmission system includes a master wireless access device and a secondary wireless access device. When the duplication operation is executed, the UE sends a PDCP PDU to each wireless access device on a respective link of the wireless access device. Correspondingly, the master wireless access device receives the PDCP PDU, and sends a PDCP status report to the UE. Correspondingly, the UE receives the PDCP status report sent by the master wireless access device. When the wireless access device includes the master wireless access device and the secondary wireless access device, the PDCP status report is used to instruct the UE to: notify an RLC layer corresponding to the master wireless access device and an RLC layer corresponding to each secondary wireless access device executing the duplication operation of an SN corresponding to a correctly received PDCP PDU; and instruct the RLC layer corresponding to the master wireless access device and the RLC layer corresponding to each secondary wireless access device executing the duplication operation to stop an RLC PDU ARQ corresponding to the correctly received PDCP PDU at the RLC layer; or when the wireless access device includes the secondary wireless access device, the PDCP status report is used to instruct the UE to: notify an RLC layer corresponding to each secondary wireless access device executing the duplication operation of an SN corresponding to a correctly received PDCP PDU; and instruct the RLC layer corresponding to each secondary wireless access device executing the duplication operation to stop an RLC PDU ARQ corresponding to the correctly received PDCP PDU at the RLC layer.

The master wireless access device may periodically send the PDCP status report to the UE.

That the UE sends PDCP PDUs to the master wireless access device and one secondary wireless access device is used as an example for description. For example, a PDCP layer of the UE receives 5 UL packets, and generates PDCP PDUs 1/2/3/4/5. The PDCP layer of the UE sends the PDCP PDUs 1/2/3/4/5 to the master wireless access device through the RLC layer/a MAC layer/a PHY layer corresponding to the master wireless access device, and the PDCP layer of the UE sends the PDCP PDUs 1/2/3/4/5 to each secondary wireless access device through the RLC layer/a MAC layer/a PHY layer corresponding to the secondary wireless access device. If the master wireless access device correctly receives the PDCP PDUs 1/4/5, the secondary wireless access device correctly receives the PDCP PDUs 2/5, and the secondary wireless access device further forwards the correctly received PDCP PDUs 2/5 to the master wireless access device through the Xn interface, the PDCP layer of the master wireless access device re-sorts the received PDCP PDUs, performs duplicate packet detection, and determines that the PDCP PDUs 1/2/4/5 are correctly received. In this case, the master wireless access device may send the PDCP status report to the UE, to notify that the PDCP PDUs with the SNs 1/2/4/5 are correctly received. The PDCP layer of the UE notifies the RLC layer corresponding to the master wireless access device of the SNs, and instructs the RLC layer to stop RLC PDU ARQs corresponding to the PDCP PDUs with the SNs 1/2/4/5 at the RLC layer. Then, the PDCP layer of the UE notifies the RLC layer corresponding to the secondary wireless access device, and instructs the RLC layer to stop RLC PDU ARQs corresponding to the PDCP PDUs with the SNs 1/2/4/5 at the RLC layer, thereby reducing an unnecessary resource waste.

According to the data transmission method provided in this embodiment of the present application, when the UE executes the duplication operation, the UE transmits same data through a plurality of links. In this way, a link with relatively good link signal quality in the plurality of links may be used to improve reliability of the data transmission. When the UE executes the switching operation, the UE selects one from a plurality of links. The selected link usually has relatively good quality. Therefore, reliability of the data transmission can also be improved. This resolves a problem that, in the existing technology, data can be transmitted only through a single link and URLLC data transmission reliability cannot be ensured, and meets a URLLC service requirement.

When no processing operation needs to be executed, the master wireless access device sends the deactivation indication information to the UE, to instruct the UE to stop the processing operation, thereby reducing additional resource overheads caused by data transmission performed through the processing operation.

The UE sends the capability information to the wireless access device to indicate whether the UE supports the processing operation. After determining that the UE supports the processing operation, the wireless access device sends the first indication information to the UE, thereby avoiding a resource waste caused by sending the first indication information to the UE when the UE does not support the processing operation.

Figure 10:
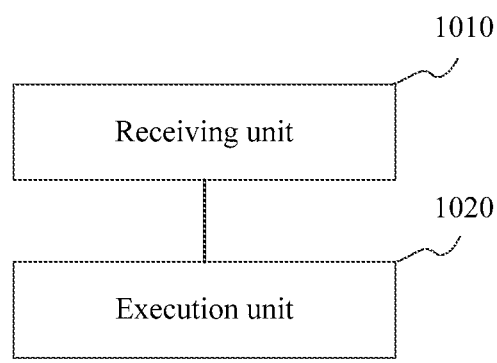
FIG. 10 is a structural diagram of a data transmission apparatus according to an embodiment of the present application.

FIG. 10 is a block diagram of a data transmission apparatus according to an embodiment of the present application. The data transmission apparatus may be implemented as a whole or a part of a UE by using software, hardware, or a combination of software and hardware. The data transmission apparatus may include a receiving unit 1010 and an execution unit 1020.

The receiving unit 1010 is configured to implement a function of step 505.

The execution unit 1020 is configured to implement a function of step 506.

Optionally, the data transmission apparatus may further include a first sending unit, configured to implement a function of step 501.

Optionally, the data transmission apparatus may further include a first determining unit, configured to determine a serving cell that sends downlink data to the UE as a serving cell for performing a duplication operation.

Optionally, the data transmission apparatus may further include a second determining unit, configured to determine a wireless access device that sends downlink data to the UE as a wireless access device for performing a duplication operation.

For related details, refer to the method embodiment described in FIG. 5.

It should be noted that, the receiving unit 1010 may be implemented by a transceiver in the UE; the execution unit 1020, the first determining unit, and the second determining unit may be implemented by a processor in the UE.

Figure 11:
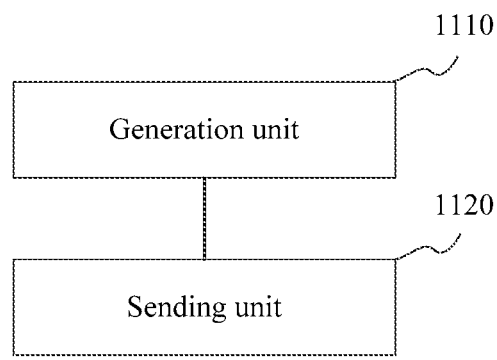
FIG. 11 is a structural diagram of a data transmission apparatus according to an embodiment of the present application.

FIG. 11 is a block diagram of a data transmission apparatus according to an embodiment of the present application. The data transmission apparatus may be implemented as a whole or a part of a master wireless access device by using software, hardware, or a combination of software and hardware. The data transmission apparatus may include a generation unit 1110 and a sending unit 1120.

The generation unit 1110 is configured to implement a function of step 503.

The sending unit 1120 is configured to implement a function of step 504.

Optionally, the data transmission apparatus may further include a first receiving unit, configured to receive configuration information of an SRB that is sent by a secondary wireless access device.

Optionally, the data transmission apparatus may further include a second receiving unit, configured to implement a function of step 502.

For related details, refer to the method embodiment described in FIG. 5.

It should be noted that, the generation unit 1110 may be implemented by a processor in the master wireless access device; the sending unit 1120, the first receiving unit, and the second receiving unit may be implemented by a transceiver in the master wireless access device.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions.

It may be clearly understood by a person of ordinary skill in the art that, for convenient and brief description, for a detailed working process of the foregoing apparatus and unit, refer to a corresponding process in the foregoing method embodiments, and details are not described herein again.

In embodiments provided in this application, it should be understood that the disclosed apparatus and method may be implemented in other manners. For example, the described apparatus embodiments are merely exemplary. For example, the unit division may merely be logical function division and may be other division during actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments.

The foregoing descriptions are merely exemplary implementations of the present application, and are not intended to limit the protection scope of the present application. Any variation or replacement readily figured out by a person skilled in the art within the technical scope disclosed in the present application may fall within the protection scope of the present application.

What is claimed is:

1. A method, comprising:
receiving, by a user equipment (UE) from a wireless access device, configuration information of at least one data radio bearer (DRB) supporting a duplication operation;
receiving, by the UE from the wireless access device, first indication information and an identifier of a DRB, wherein the first indication information comprises a data volume threshold to be used by the UE to determine whether to execute the duplication operation or a switching operation, wherein the duplication operation comprises transmitting same packet data convergence protocol (PDCP) protocol data units (PDUs) through a plurality of links, wherein the switching operation comprises selecting a link from the plurality of links for sending to-be-sent uplink data, wherein the first indication information and the identifier of the DRB are carried in a same medium access control (MAC) control element (CE), and wherein the DRB belongs to the at least one DRB supporting the duplication operation;

determining, by the UE, whether to execute the duplication operation or the switching operation based on the data volume threshold, wherein in case a data volume of the to-be-sent uplink data is less than the data volume threshold, the UE determines to execute the duplication operation, and in case the data volume of the to-be-sent uplink data is greater than the data volume threshold, the UE determines to execute the switching operation; and based on the determination, executing, by the UE, the duplication operation for the DRB or the switching operation;

wherein the wireless access device is a master wireless device in a dual connectivity (DC) scenario or a multiple connectivity (MC) scenario, wherein the plurality of links comprises a link between the UE and the master wireless device and a link between the UE and a secondary wireless access device, and wherein the method further comprises:
  sending, by the UE, a buffer status report (BSR) to the master wireless access device, wherein the BSR includes a sum of a data volume at a packet data convergence protocol (PDCP) layer of the master wireless access device and a data volume at a radio link control (RLC) layer of the master wireless access device; and
  sending, by the UE, another BSR to the secondary wireless access device, wherein the another BSR includes a sum of the data volume at the PDCP layer of the master wireless access device and a data volume at an RLC layer of the secondary wireless access device.

2. The method according to claim 1, further comprising:
sending, by the UE, capability information of the UE to the wireless access device, wherein the capability information indicates that the UE supports the duplication operation.

3. A method, comprising:
configuring, by a wireless access device for a user equipment (UE), at least one data radio bearer (DRB) supporting a duplication operation;
sending, by the wireless access device to the UE, configuration information of the at least one DRB supporting the duplication operation;
generating, by the wireless access device, first indication information, wherein the first indication information comprises a data volume threshold to be used for the UE to determine whether to execute the duplication operation or a switching operation, such that in case a data volume of to-be-sent uplink data is less than the data volume threshold, the UE determines to execute the duplication operation, and in case the data volume of the to-be-sent uplink data is greater than the data volume threshold, the UE determines to execute the switching operation, wherein the duplication operation comprises transmitting same packet data convergence protocol (PDCP) protocol data units (PDUs) through a plurality of links, and wherein the switching operation comprises selecting a link from the plurality of links for sending the to-be-sent uplink data; and sending, by the wireless access device to the UE, the first indication information and an identifier of a DRB, wherein the first indication information and the identifier of the DRB are carried in a same medium access control (MAC) control element (CE), and wherein the DRB belongs to the at least one DRB supporting the duplication operation;

wherein the wireless access device is a master wireless device in a dual connectivity (DC) scenario or a multiple connectivity (MC) scenario, and the plurality of links comprises a link between the UE and the master wireless device and a link between the UE and a secondary wireless access device;

wherein the link between the UE and the master wireless device is for transmission of a buffer status report (BSR) from the UE to the master wireless device, wherein the BSR includes a sum of a data volume at a packet data convergence protocol (PDCP) layer of the master wireless access device and a data volume at a radio link control (RLC) layer of the master wireless access device; and wherein the link between the UE and the secondary wireless access device is for transmission of another BSR from the UE to the secondary wireless access device, wherein the another BSR includes a sum of the data volume at the PDCP layer of the master wireless access device and a data volume at an RLC layer of the secondary wireless access device.

4. The method according to claim 3, wherein the method further comprises:
receiving, by the wireless access device, capability information from the UE, wherein the capability information indicates that the UE supports the duplication operation.

5. An apparatus, comprising:
at least one processor; and
a memory coupled to the at least one processor;
wherein the at least one processor is configured to execute processor-executable instructions stored in the memory to facilitate:
receiving, from a wireless access device, configuration information of at least one data radio bearer (DRB) supporting a duplication operation;
receiving, from the wireless access device, first indication information and an identifier of a DRB, wherein the first indication information comprises a data volume threshold to be used by the apparatus to determine whether to execute the duplication operation or a switching operation, wherein the duplication operation comprises transmitting same packet data convergence protocol (PDCP) protocol data units (PDUs) through a plurality of links, wherein the switching operation comprises selecting a link from the plurality of links for sending to-be-sent uplink data, wherein the first indication information and the identifier of the DRB are carried in a same medium access control (MAC) control element (CE), and wherein the DRB belongs to the at least one DRB supporting the duplication operation;
determining whether to execute the duplication operation or the switching operation based on the data volume threshold, wherein in case a data volume of the to-be-sent uplink data is less than the data volume threshold, the apparatus determines to execute the duplication operation, and in case the data volume of the to-be-sent uplink data is greater than the data volume threshold, the apparatus determines to execute the switching operation; and based on the determination, executing the duplication operation for the DRB or the switching operation;

wherein the wireless access device is a master wireless device in a dual connectivity (DC) scenario or a multiple connectivity (MC) scenario, wherein the plurality of links comprises a link between the apparatus and the master wireless device and a link between the apparatus and a secondary wireless access device, and wherein the at least one processor is further configured to execute processor-executable instructions stored in the memory to facilitate:

sending a buffer status report (BSR) to the master wireless access device, wherein the BSR includes a sum of a data volume at a packet data convergence protocol (PDCP) layer of the master wireless access device and a data volume at a radio link control (RLC) layer of the master wireless access device; and sending another BSR to the secondary wireless access device, wherein the another BSR includes a sum of the data volume at the PDCP layer of the master wireless access device and a data volume at an RLC layer of the secondary wireless access device.

6. The apparatus according to claim 5, wherein the at least one processor is further configured to execute processor-executable instructions stored in the memory to facilitate:

sending capability information of the apparatus to the wireless access device, wherein the capability information indicates that the apparatus supports the duplication operation.

7. An apparatus, comprising:

at least one processor; and a memory coupled to the at least one processor;

wherein the at least one processor is configured to execute processor-executable instructions stored in the memory to facilitate:

configuring, for a user equipment (UE), at least one data radio bearer (DRB) supporting a duplication operation;

sending, to the UE, configuration information of the at least one DRB supporting the duplication operation;

generating first indication information, wherein the first indication information comprises a data volume threshold to be used for the UE to determine whether to execute the duplication operation or a switching operation, such that in case a data volume of to-be-sent uplink data is less than the data volume threshold, the UE determines to execute the duplication operation, and in case the data volume of the to-be-sent uplink data is greater than the data volume threshold, the UE determines to execute the switching operation, wherein the duplication operation comprises transmitting same packet data convergence protocol (PDCP) protocol data units (PDUs) through a plurality of links, and wherein the switching operation comprises selecting a link from the plurality of links for sending the to-be-sent uplink data; and sending, to the UE, the first indication information and the identifier of the DRB, wherein the first indication information and the identifier of the DRB are carried in a same medium access control (MAC) control element (CE), and wherein the DRB belongs to the at least one DRB supporting the duplication operation;

wherein the apparatus is a master wireless device in a dual connectivity (DC) scenario or a multiple connectivity (MC) scenario, and the plurality of links comprises a link between the UE and the master wireless device and a link between the UE and a secondary wireless access device;

wherein the link between the UE and the master wireless device is for transmission of a buffer status report (BSR) from the UE to the master wireless device, wherein the BSR includes a sum of a data volume at a packet data convergence protocol (PDCP) layer of the master wireless access device and a data volume at a radio link control (RLC) layer of the master wireless access device; and wherein the link between the UE and the secondary wireless access device is for transmission of another BSR from the UE to the secondary wireless access device, wherein the another BSR includes a sum of the data volume at the PDCP layer of the master wireless access device and a data volume at an RLC layer of the secondary wireless access device.

8. The apparatus according to claim 7, wherein the at least one processor is further configured to execute the processor-executable instructions stored in the memory to facilitate:

receiving capability information from the UE, wherein the capability information indicates the UE supports the duplication operation.

* * * * *